M. A. KELLER.
Grain Gleaner and Binder.
No. 231,914. Patented Sept. 7, 1880.
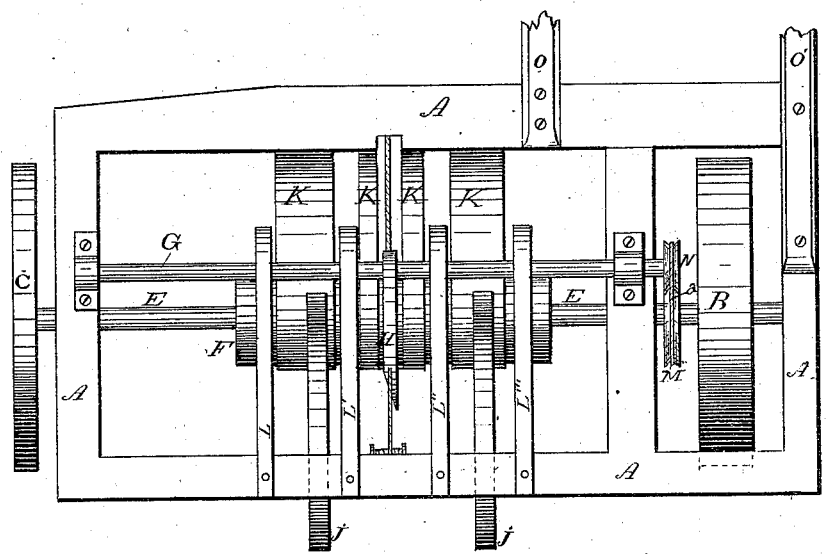
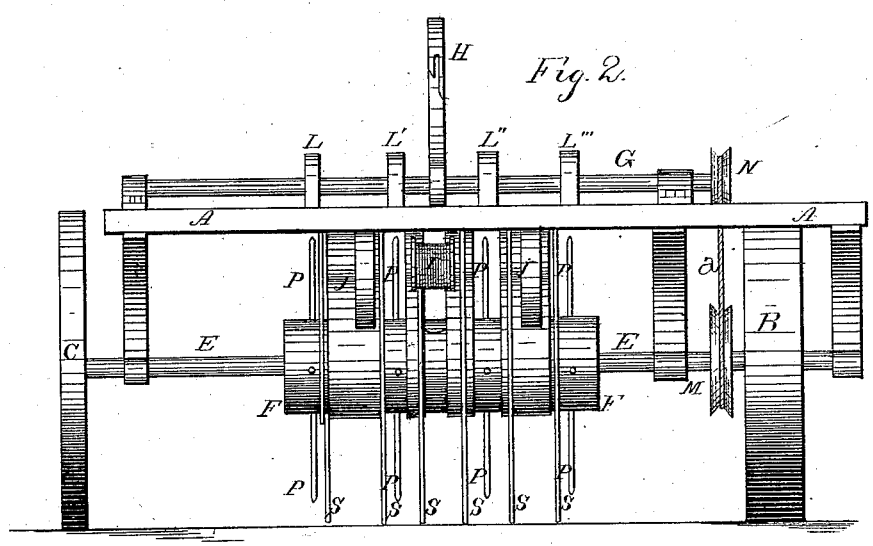
Witnesses:
J. W. Garner
W. S. D. Haines
Inventor:
M. A. Keller
per J. A. Lehmann
Atty

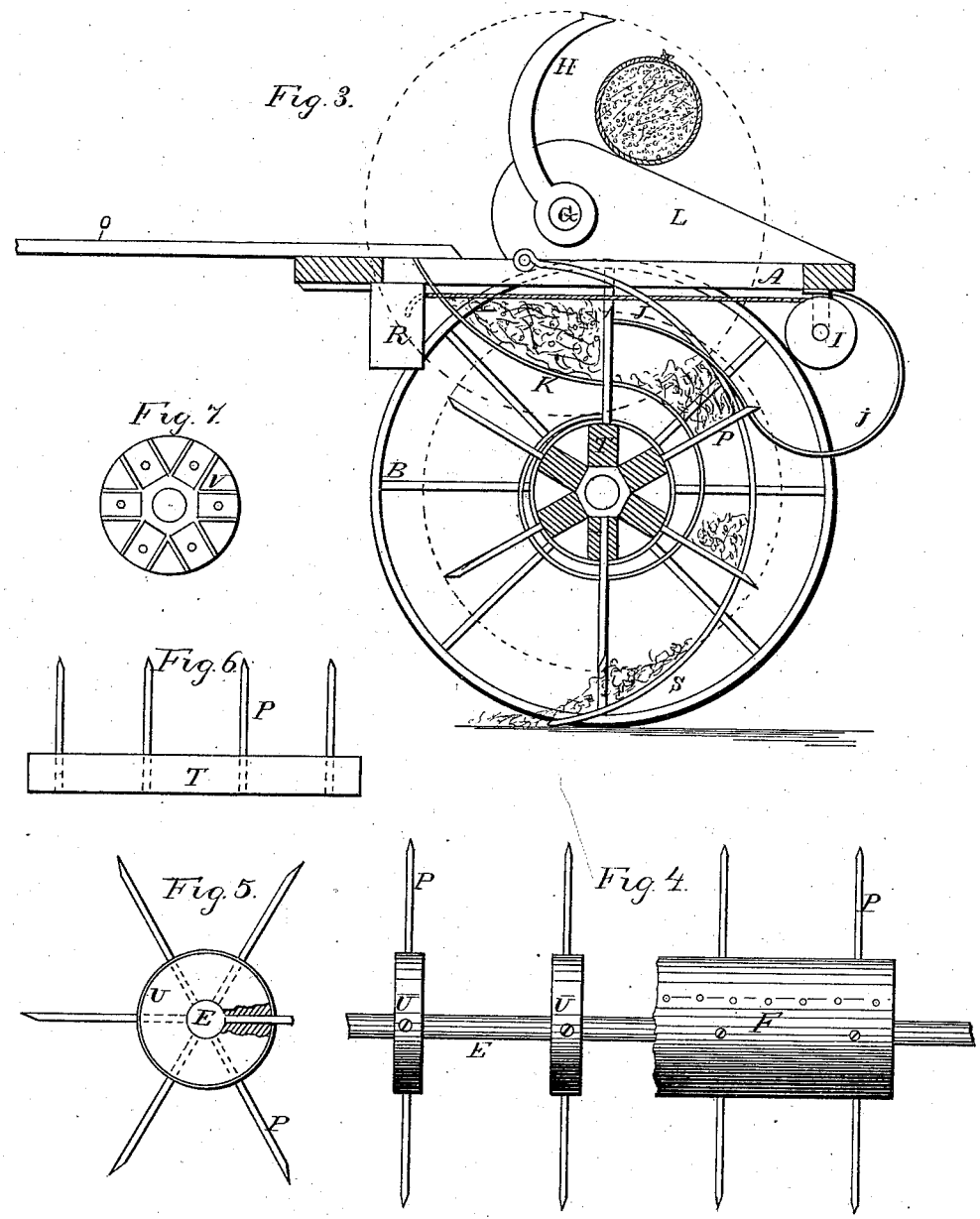

UNITED STATES PATENT OFFICE.

MOSES A. KELLER, OF FREMONT, OHIO, ASSIGNOR OF ONE-HALF OF HIS RIGHT TO WINFIELD J. ENGLEBECK, OF SAME PLACE.

GRAIN GLEANER AND BINDER.

SPECIFICATION forming part of Letters Patent No. 231,914, dated September 7, 1880.

Application filed October 15, 1878.

*To all whom it may concern:*

Be it known that I, MOSES A. KELLER, of Fremont, in the county of Sandusky and State of Ohio, have invented certain new and useful Improvements in Grain Gleaning and Binding Machines; and I do hereby declare the following to be a full, clear, and exact description of the invention, such as will enable others skilled in the art to which it pertains to make and use it, reference being had to the accompanying drawings, which form part of this specification.

My invention relates to an improvement in grain gleaning and binding machines; and it consists in the construction and arrangement of the parts, which will hereinafter be more fully described.

Figure 1 is a plan view. Fig. 2 is a rear longitudinal elevation. Fig. 3 is a transverse sectional elevation. Figs. 4, 5, 6, and 7 are details of the machine.

Similar letters of reference denote corresponding parts where used.

A designates the main frame; O O', the shafts by which the horse guides the machine; B and C, the ground or supporting wheels; E, the axle for the same, and upon which are mounted the entire frame, binding, and elevating mechanisms.

Upon the shaft E are secured a number of disks, U, in which the elevating-prongs P are secured, and over these disks is secured the sheet-iron which forms the cylinder F closed at all points. Instead of these solid disks, iron heads may be used, to which the wooden staves T are secured. When these staves are used the sheet-iron may be applied directly to them, as shown in Fig. 3.

As the grain is being raised from the ground, in order to prevent it from being wrapped round and round the cylinder the scrolls K are used. These scrolls have their upper ends fastened to the frame, extend backward over the top of the cylinder, and have their lower ends wrapped upon the cylinder until the ends come in contact with it. These scrolls are wide enough to occupy all, or nearly all, of the space between the elevating-prongs P, and form a support for the bundle while being bound, as shown in Fig. 3.

In order to prevent the grain from getting beyond the reach of the elevating-prongs P, the fenders *j*, having their rear ends fastened to the rear sill of the frame, are used. These fenders extend forward, as shown in Fig. 3, and serve to hold the unbound bundles from moving too far back out of the reach of the prongs just as the bundle begins to curve up over the cylinder.

The tying mechanism R, of any construction that may be preferred, so that it will hold the end of the cord after the bundle has been bound, is secured to the under side of the front sill of the frame, while the spool I is secured to the rear sill directly across from it.

As will be seen in Fig. 3, the cord is always kept stretched across the frame just over the next bundle that is to be bound.

The binding-arm H is secured to the constantly-revolving shaft G, which shaft has a pulley, N, on its end to receive motion from the large wheel M on the shaft E through the chain or band *a*.

The outer end of the arm H is notched, as shown in Figs. 1 and 2, so that every time the arm sweeps around it descends upon the top of the cord and carries it down under and around the bundle into the tying mechanism, where the knot is tied, the cord cut, and the end held for the next bundle. After the knot has been tied the arm carries the bundle on up over the curved ends of the slats L L' L'' L''', which are supported in front by the shaft G, and at their rear ends upon the rear sill of the frame. As shown in Fig. 3, the table formed by these slats inclines downward toward the rear edge of the frame, so that as soon as the bundle rises up over the curved ends of the slats it rolls off of the frame to the ground.

Having thus described my invention, I claim—

1. The combination, with the toothed elevating-cylinder F, of the gleaner-teeth S, yielding grain-supporting scrolls K, the yielding grain-compressors J, forming an ascending grain-passage, and a rotating binding-arm, H, arranged to gather the gavel from the throat of said passage and deliver it bound over the axis of said binding-arm upon the ground in the rear of the machine.

2. In a grain gleaner and binder, the combination of the shaft E, the disks U, teeth P, secured to said disks, and the covering of sheet metal for forming the cylinder F, substantially as shown.

In testimony that I claim the foregoing I have hereunto set my hand this 10th day of October, 1878.

MOSES A. KELLER.

Witnesses:
H. L. BUCKLAND,
W. J. ENGLEBECK.